June 18, 1929.  W. V. SEIFERT  1,717,739
ROTARY ENGINE
Filed Dec. 29, 1925  5 Sheets-Sheet 1

INVENTOR
William V. Seifert.
BY
ATTORNEY

June 18, 1929. W. V. SEIFERT 1,717,739
ROTARY ENGINE
Filed Dec. 29, 1925 5 Sheets-Sheet 2

INVENTOR.
William V. Seifert
BY
ATTORNEY.

June 18, 1929.　　W. V. SEIFERT　　1,717,739
ROTARY ENGINE
Filed Dec. 29, 1925　　5 Sheets-Sheet 3

INVENTOR.
William V. Seifert.
BY
ATTORNEY.

June 18, 1929.  W. V. SEIFERT  1,717,739
ROTARY ENGINE
Filed Dec. 29, 1925   5 Sheets-Sheet 4
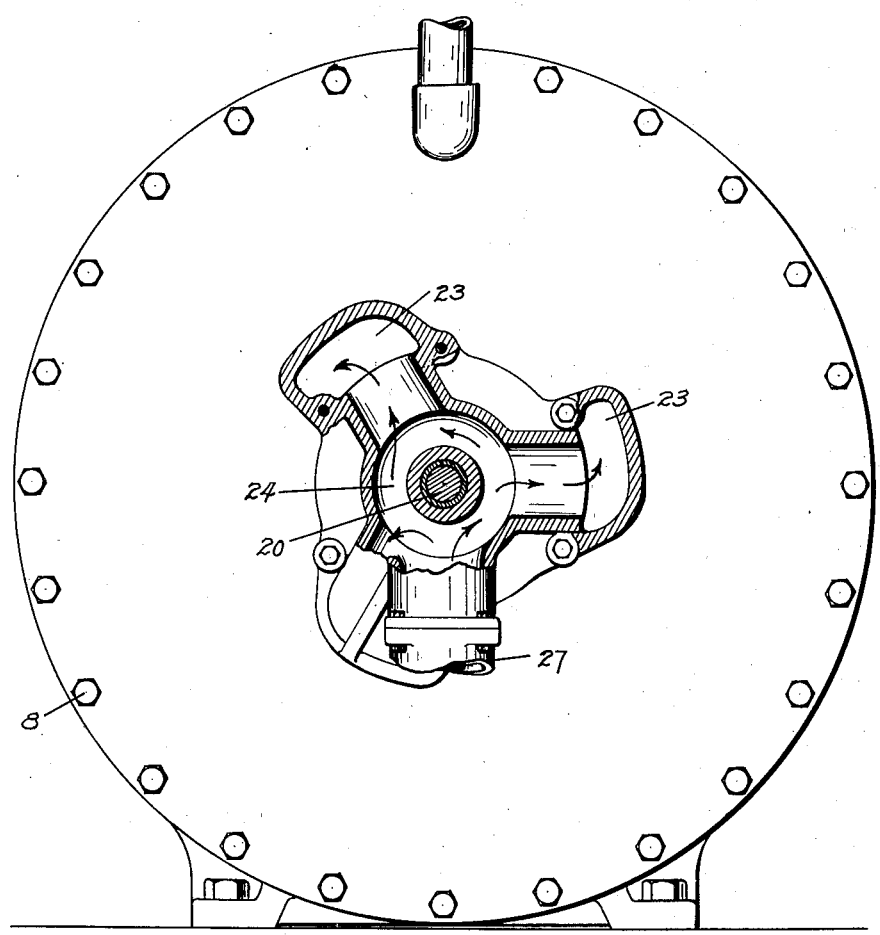
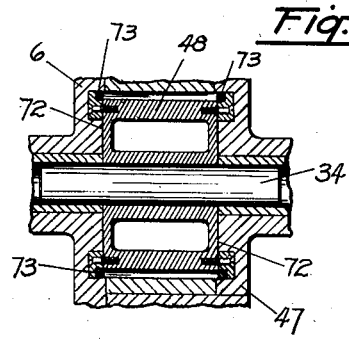
Fig. 11.
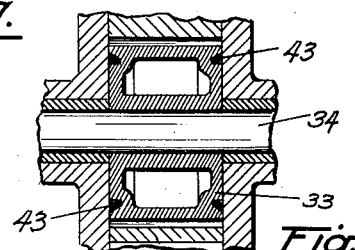
Fig. 12.
INVENTOR.
William V. Seifert.
BY
ATTORNEY.

June 18, 1929.  W. V. SEIFERT  1,717,739
ROTARY ENGINE
Filed Dec. 29, 1925   5 Sheets-Sheet 5

INVENTOR.
William V. Seifert
BY
ATTORNEY.

Patented June 18, 1929.

1,717,739

UNITED STATES PATENT OFFICE.

WILLIAM V. SEIFERT, OF DENVER, COLORADO.

ROTARY ENGINE.

Application filed December 29, 1925. Serial No. 78,169.

This invention relates to rotary engines and its primary object is to provide an engine in which simplicity of construction and operation is combined with great efficiency and practicability in use.

Another object of the invention is to provide an engine of the above described character in which leakage of motive fluid and consequent back pressure and loss of energy are reduced to a minimum. Another object is to provide an engine, the rotary element of which is impelled by a rapid succession of impulses during each revolution. A further object is to provide a rotary engine of the internal combustion type in which the rotary element is continuously subjected to the influence of both high-pressure and low-pressure motive fluid, and still another object is to provide in cooperative association with the engine proper, a compressor-element which in the operation, delivers the fuel derived from a conveniently positioned carburetor or other source, in a compressed condition to the combustion chambers of the engine.

The above enumerated objects of the invention cover only those features which are elementally distinctive over other engines of the same or similar type heretofore devised, and it is to be understood that the invention has many other objects principally relating to details of construction and to the compact and advantageous arrangement of parts, all of which will be fully brought out in the course of the following description.

Figure 1:
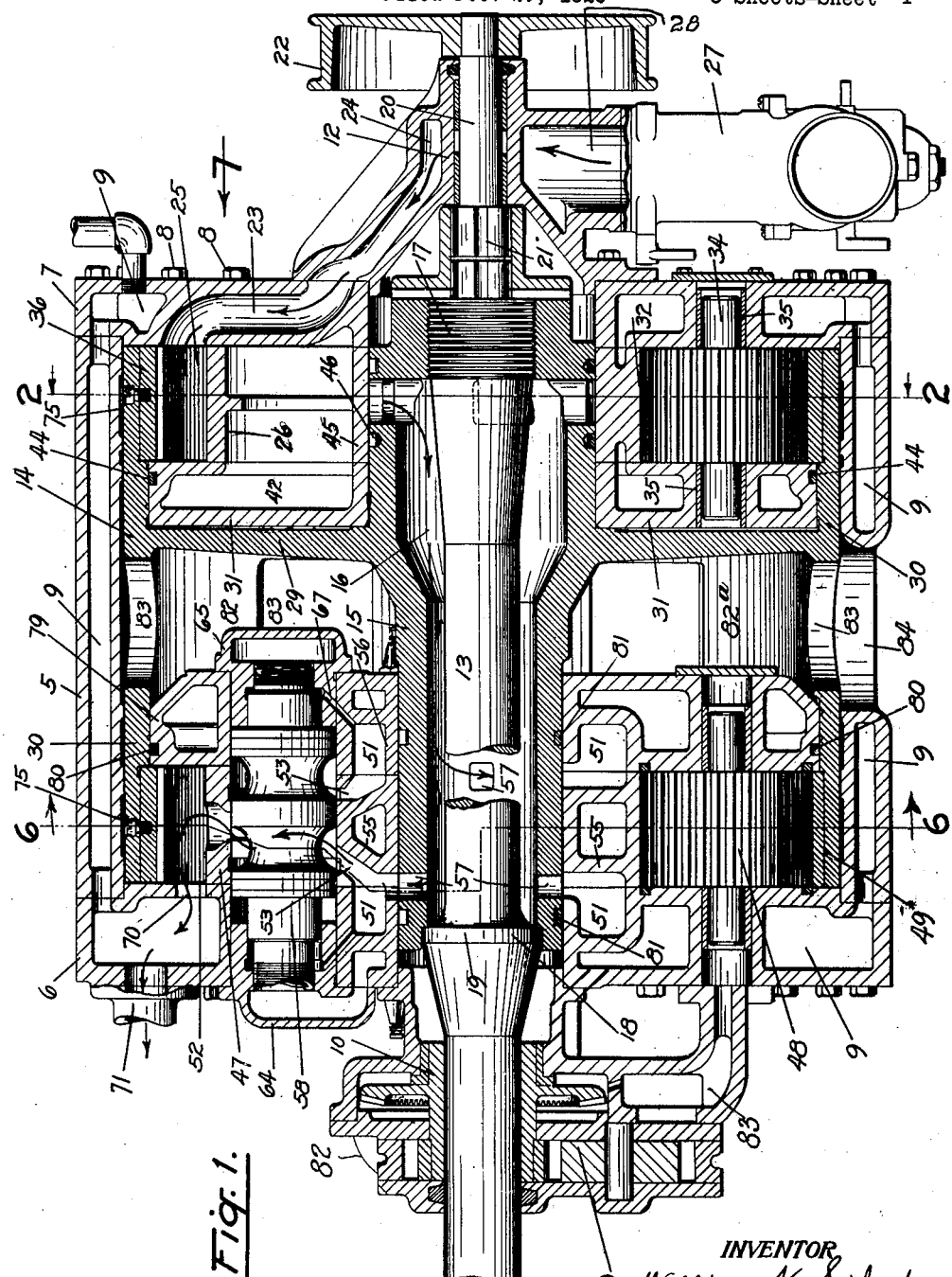
Figure 2:
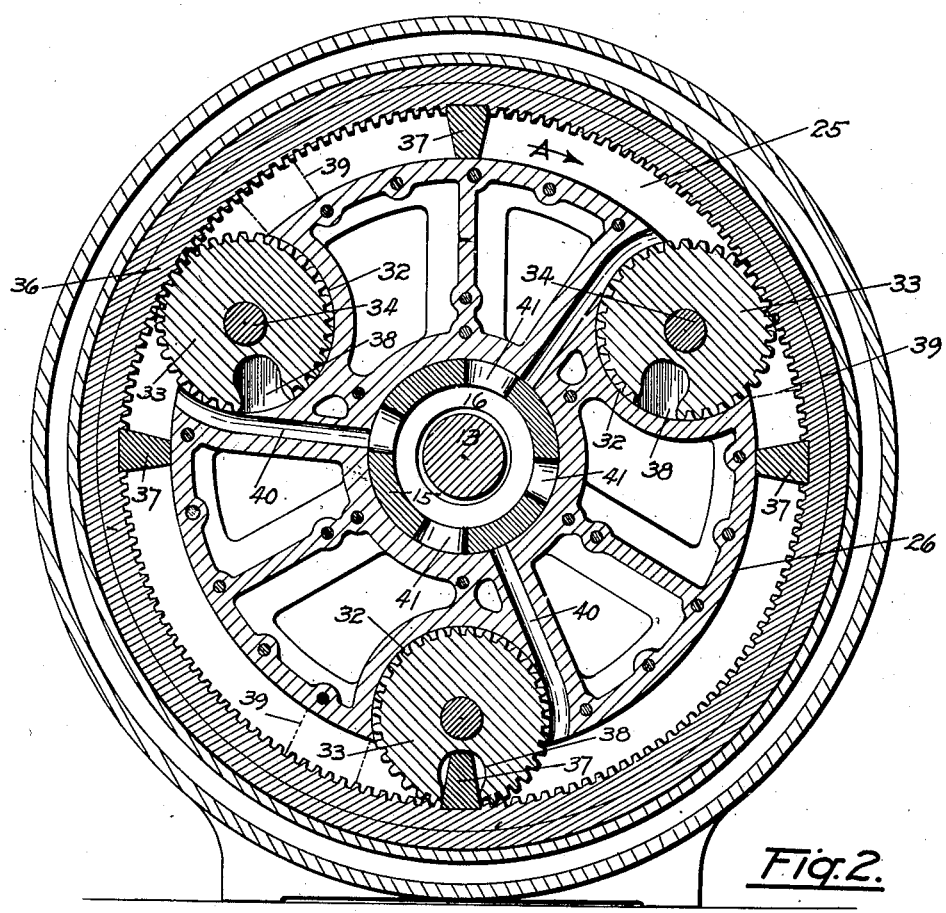
Figure 6:
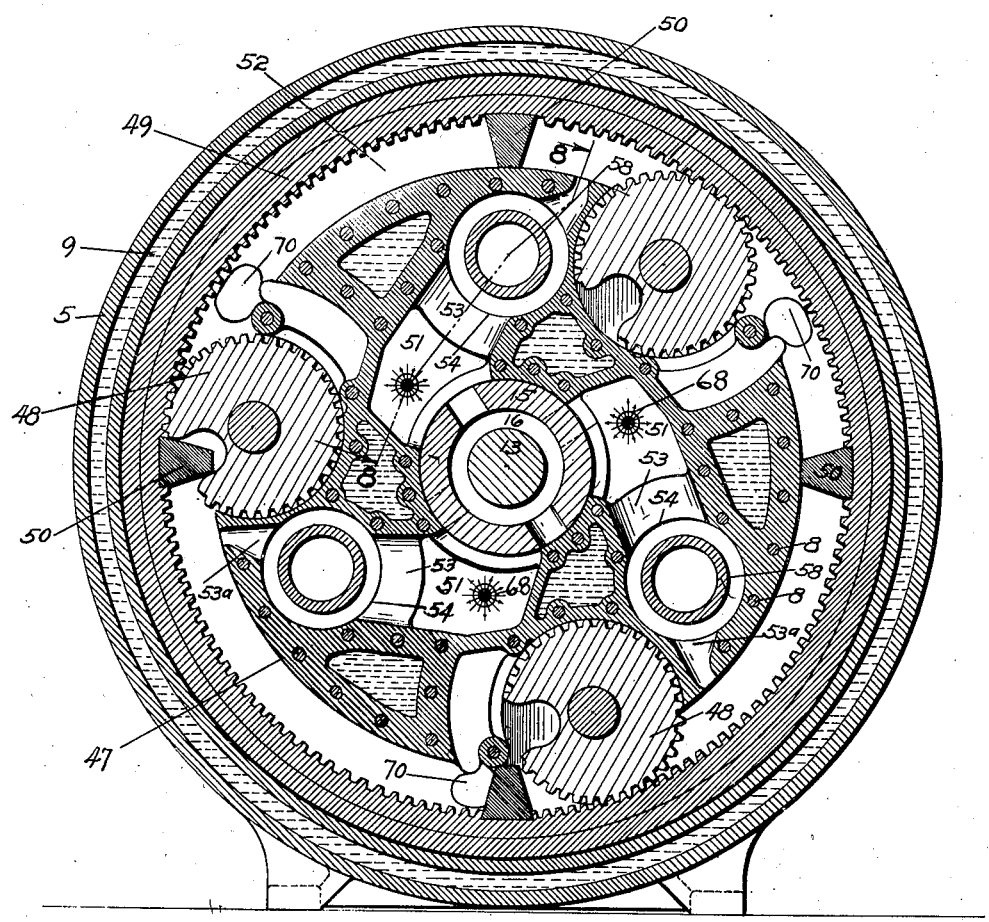
Figure 8:
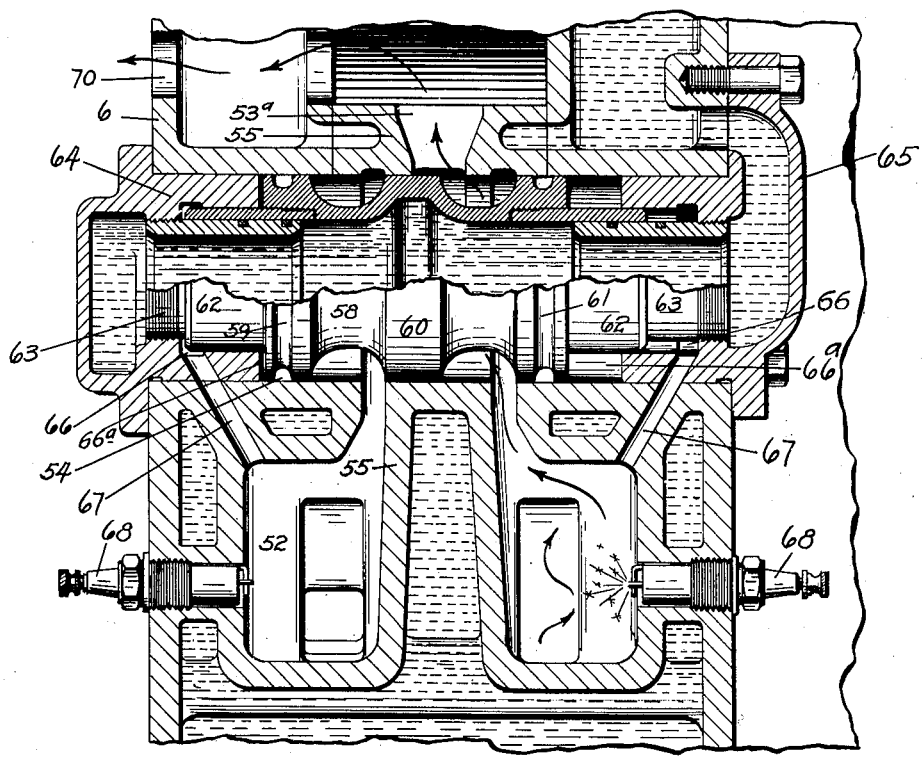
Figure 9:
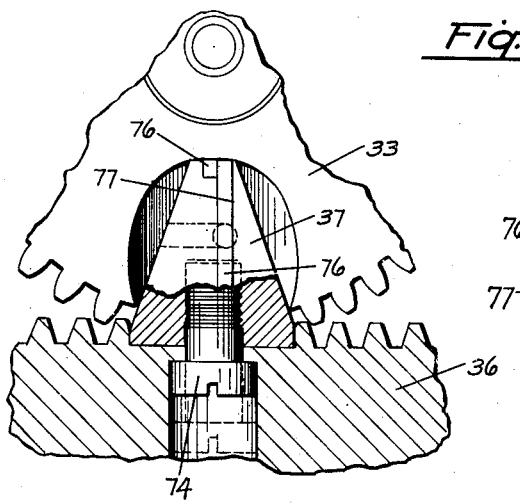
Figure 10:
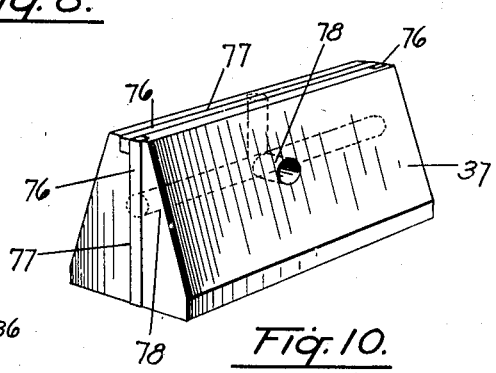

In the accompanying drawings, in which similar characters of reference designate corresponding parts throughout the several views, Figure 1 represents a vertical sectional elevation of an engine constructed in accordance with the present invention, Figure 2, a vertical transverse section of the compressor-element of the engine along the line 2—2, Figure 1, Figures 3, 4 and 5, sections similar to Figure 2, but drawn to a reduced scale illustrating different positions of the rotor of the compressor in the cyclic operation thereof, Figure 6, a vertical transverse section of the power-element of the engine taken on the line 6—6, Figure 1, Figure 7, a partially sectional end elevation of the engine, looking in the direction of the arrow 7 in Figure 1, Figure 8, an enlarged sectional elevation of one of the valve-members and thereto adjacent cooperative parts of the engine, in a plane indicated by the line 8—8 in Figure 6, Figure 9, an enlarged and fragmentary sectional elevation of one of the piston-members of the engine and one of the therewith coordinating rotary abutment-members of the same, Figure 10, a perspective view of one of the pistons of the engine, Figure 11, a section through one of the rotary abutment-members of the power-element of the engine, and Figure 12, a similar view of one of the rotary abutment-members of the compressor-element of the same.

The engine comprises a stationary housing composed of a body section 5 and two head sections 6 and 7 closing the ends thereof. The three sections are fastened together by bolts 8 and they are provided with passages 9 for the circulation of a cooling fluid, water preferred.

Fastened centrally of the heads 6 and 7 are fluid-tight bearings 10 and 12 for the rotary support of a shaft 13 which in the operation serves to transmit the movement of a rotor-element 14 common to both the compressor-unit and the power-unit of the engine.

The rotor comprises a hollow hub 15 which in the operation of the engine provides a reservoir 16 for the motive fluid compressed by the compressor-unit and which is rigidly fastened on the shaft by means of a screw thread at one end and a shoulder at its opposite end, the shoulder 18 being drawn into air-tight engagement with a corresponding breast 19 on the shaft, when an externally screw-threaded enlargement 17 of the latter is screwed into a correspondingly tapped opening of the hub. The bore of the hub 15 which is of hollow cylindrical form, is of smaller diameter within the power-unit than within the compression-unit, thereby tapering the reservoir from the point at which the compressed fuel is admitted to the passage connected with the ports through which it is delivered to the power-unit, for the purpose of effecting a thorough intermixture of the charges and by frictional contact with the walls of the narrowed passage, and the heat evolved in the operation, a complete vaporization of their liquid particles.

A part 20 of the shaft 13 mounted in the bearing 12 of the head 7 is made separate from the body-portion of the same, and the two parts are connected by a flexible coupling 21 to facilitate adjustment when the engine is assembled. A pulley 22 at the protruding end of the shaft-section 20 functions as usual for the support of a fan-belt.

The head 7 at the compressor end of the engine has three equi-distant radial ducts 23 which connect with a central chamber 24 formed in the corresponding bearing 12, for the distribution of a combustible fluid mixture admitted to the chamber from a carburetor to an annular compression-chamber 25 formed inside the rotor 14 by a relatively stationary cylinder 26. The carburetor shown at 27 in Figures 1 and 7 of the drawings, is connected with the chamber 24 in the bearing by means of a passage 28.

The power-unit and the compressor-unit of the engine are divided from each other by a partition provided by a web 29 which forms an integral connection between the before-mentioned hollow hub 15 of the rotor and a therewith concentric circumferential wall portion 30 of the same.

Referring further to the compressor-unit, the before-mentioned stationary cylinder 26 occupies the space between the head 7 of the engine-housing and the partition 29 of the rotor and fits snugly around the corresponding part of the hub 15 of the same.

The stationary part 26 which may be termed the stator of the compressor, includes an enlarged head 31 fitted within the wall-portion of the rotor, but its major portion is spaced from the inner surface of the wall to form the annular compression chamber 25 hereinbefore referred to.

The smaller cylindrical part of the core has a plurality of equi-distant peripheral and circular recesses 32 in which are mounted the rotary abutment-members 33 which cooperate with piston-heads hereinafter to be described, to compress the fluid mixture admitted to the compression space through the ducts 23, in the operation of the engine.

The abutment-members consist of peripherally toothed wheels supported on shafts 34 by means of which they are rotatably mounted in central holes lined with anti-friction bushings 35, at opposite sides of the recesses 32.

The toothed wheels mesh with an internal gear 36 provided by an annulus rigidly fastened upon the inner surface of the portion of the rotor-wall around the stationary cylinder, the method of fastening the gear having been shown in Figure 1.

Projecting inwardly from the gear-wheel at equi-distant points thereof are a plurality of piston-heads 37 which in the operation cooperate with the abutment-wheels to compress the fluid in the annular compression chamber 25.

In order to provide for the passage of the piston heads in the rotary movement of the rotor, the gear-wheels have peripheral recesses 38, the distances between the heads and the radii of the gear-wheels and the internal gear being proportioned so that the piston heads are brought into register with the recesses of the several abutment wheels at the proper moments in the movement of the rotor and the corresponding movements of the wheels.

The motive fluid supplied to the ducts 23 from the carburetor is admitted directly to the compressor chamber at three equi-distant points thereof, indicated in Figures 2 to 5 of the drawings by the numerals 39, and the fluid is after compression exhausted from the compression-chamber into the reservoir 16 inside the hub of the rotor through annular ducts 40 in the stator and therewith registering ports 41 in the hub.

The ducts 40 are located immediately rearward of the recesses 32 of the cylinder with reference to the direction of rotation of the rotor indicated in the drawings by the arrow A, and the part of the stator outside of those portions in which the ducts are formed is hollowed as at 42 for the circulation of the cooling fluid supplied to the sections of the housing.

The stator may be fastened in place by the same bolts which connect the head-sections of the housing upon the ends of the body-section of the same.

The toothed wheels 33 fit snugly upon the circumferential surfaces of the recesses in which they are mounted and they are provided with packing-rings 43 shown in Figure 12 to prevent the leakage of fluid between their end surfaces and the corresponding sides of the recesses.

Packing rings are also applied between the enlarged head 31 of the stator and the wall of the rotor as at 44, and between the central sleeve 45 of the core and the hub of the rotor as indicated at 46.

In the construction shown in the drawings, the motive fluid is admitted to the compression chamber 25 at three equi-distant points thereof, the rotor is equipped with four equi-distant piston heads coordinating with three rotary abutment-members and the compressed fluid is discharged from the compression space through three ducts which register with four equi-distant ports in the hub of the rotor which communicate with the reservoir 16.

In the operation of the compressor the combustible mixture produced in the carburetor is constantly admitted to the compression chamber 25 through the ports 39 and compressed between the abutment-members 33 and the piston heads 37 by the rotary motion of the rotor to which the heads are fastened. The ports 41 in the hub of the rotor coordinate with the ducts 40 to admit the compressed fluid to the reservoir 16 during the periods immediately prior to the passage of the piston heads at the points of contact of the abutment-members with the internal surface of the rotor wall.

Figures 3, 4, 5:
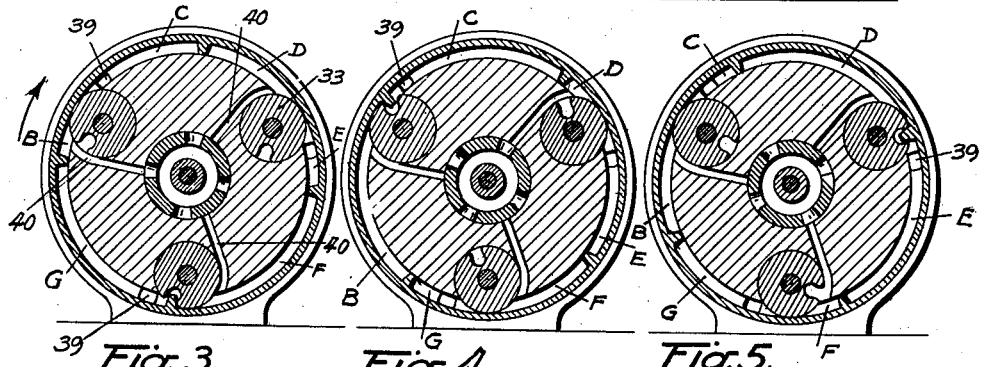

Referring for example to Figures 3, 4 and 5 of the drawings, the fluid in the space of the compression chamber marked B at the left hand side of Figure 3 is being discharged into the reservoir by connection of one of the ports 41 of the hub with the corresponding duct 40 and the respective head 37 on the rotor is about to pass the abutment-member 33 immediately forward thereof. Fresh fluid is admitted to the space C between the same abutment member and the next preceding piston head; in the following space D the fluid previously admitted through the port 39 is being compressed, in the next space E fresh fuel is initially admitted; in the space F the fuel previously supplied is being compressed; and in the last space G compression is about to take place by the passage of the piston head at the point of contact of the abutment member with the wall of the rotor.

Figure 4 illustrates the positions of the parts during the movement of the piston head that compressed the fuel in the space B past the point of contact of the respective abutment-member with the wall of the compression chamber, when, it will be noted, the fuel which in Figure 3 was taken in the space G following that from which the compressed fuel was discharged, is now being compressed while in the space C preceding the space B of Figure 1 fresh fuel is taken in.

In Figure 5, the piston head which compressed the fuel in the space B of Figure 3 has passed the intake port, and this fuel is now being compressed in the space D. During the same period the fuel is again compressed in the space B to be delivered into the reservoir when the respective piston head approaches the position shown in Figure 3.

It will thus be seen that the compression space is constantly divided into three intake spaces and three delivery spaces in alternate arrangement, that in each delivery space the fuel is compressed twice in each half revolution of the rotor and that in consequence twelve deliveries of fuel take place during each complete revolution. This result is attained by the provision of a plurality of piston heads exceeding by one the number of abutment-members or the corresponding number of delivery ducts and by providing the hub of the rotor with a plurality of ports corresponding in number, with the piston heads and exceeding by one the number of discharge ducts in the stationary cylinder.

The power unit of the engine operates on a principle similar to that of the compression unit.

Again we find a cylindrical stator 47 provided with three rotary abutment-members 48 which mesh with an internal gear-wheel 49 on the rotor, and four piston heads 50 which cooperate with the abutments but this time to impart motion to the rotor and the shaft on which the latter is mounted. So far the construction of the power-unit is identical to that of the compression unit, but the stationary element of the power-unit differs from the other in that it is cored to provide combustion spaces 51 connecting with the annular space 52 between the stator and the drum of the rotor by ducts 53 and valve-chambers 54 for the valves which control the passage of fuel to the annular space 52, as will hereinafter be more fully described.

The construction of the power-unit as shown in the drawings comprises two series of three combustion spaces at opposite sides of a partition 55 in the stator, which partition is traversed by three valve-chambers for the valves which in the operation of the engine, function to admit the burning and expanding gases alternately from the combustion-chambers of the two series to the space between the stator and the circumferential wall of the rotor. Each valve thus controls the fluid flow through two ducts at opposite sides of the partition, adapted to connect with the space 52 by a common passage 53$^a$. The combustion-chambers 51 open in the surface of the central sleeve-member 56 of the stator engaging the hub of the rotor to register with ports 57 in the hub as will hereinafter be described.

The valves which are reciprocating shuttle type, each consists of a spool 58 having three equi-distantly spaced heads 59, 60 and 61 slidingly fitted in the respective valve-chamber of the stationary cylinder and shouldered end parts 62 of reduced diameter exteriorly of the outer heads 59. In order to further guide the valves in their reciprocating motion, short tubes 63 are screw-threaded in openings at opposite ends of the valve-chambers to extend within the hollow valves as best shown in Figure 8. The parts 62 of the valves that fit upon the guide tubes may be made separate from the body-portion of the same on which the heads 59, 60 and 61 are formed.

The longitudinal extent of the valve-chambers is determined by plug members 64 and 65 which close their ends and are removably fastened upon the inner surface of the stator at one end of the chambers and upon the outer surface of the head 6 of the housing at the opposite end of the same. The spaces 66 between the shoulders of the valves and the plugs, hereinbefore referred to, are connected with the respective pair of combustion chambers of the two series by narrow passages 67.

Each of the valve-chambers connects with the space between the stator and the circumferential wall 14 of the rotor, in which in practise the gases evolved in the combustion-chambers expand to impart motion to the rotor by means of the before-mentioned single passage 53ª, so that by periodical reciprocation of the valves, motive fluid will be admitted to the space alternately from each two opposite combustion-chambers of the series.

The hub of the rotor within the sleeve-member 56 of the stator has two pairs of ports 57 at right angles to each other which register respectively with the two series of combustion-spaces in the cylinder.

The combustion-spaces are each equipped with an electric ignition appliance 68 of the spark plug type which are periodically connected in an ignition circuit through the instrumentality of a timing device designated in Figure 1 by the reference numeral 82, which is operated by geared connection with the shaft of the engine.

The stationary cylinder 47 of the power-unit is cored wherever possible for the circulation of a cooling fluid and the valves 58 as well as the plugs 65 and 66 closing the valve-chambers are hollow for the same purpose.

It is the intent of the construction to so connect the various spaces of the cooperating elements of the engine to provide for the continuous circulation of water from one to another, but since the specific method of accomplishing this object is obvious, no illustration further than that given in the present views of the drawings has been given.

The expansion-space 52 of the power-unit is connected with the atmosphere by means of three equi-distant ports for the exhaust of spent gases. The position of the ports has been indicated in Figure 6 of the drawings by the numeral 70, and they may connect with spaces in the head of the engine-housing, as shown in Figure 1, which spaces may in turn be connected with a manifold by outlet conduits 71.

The toothed wheels 48 constituting the abutment-members of the power-unit extend at their ends into recesses 72 of the stator 47 and the head of the engine-housing as shown in detail in Figure 11, and their parts within the recesses are provided with expansion packing rings 73 to insure a fluid tight connection.

The method of packing the piston heads of the rotor in both the power-unit and the compression-unit has been illustrated in Figures 9 and 10. The heads are fastened to the internal gear-wheel of each of the units by screw-bolts 74 and the gear-wheels are themselves fastened inside of the drum-member of the rotor by means of screw-bolts shown at 75 in Figure 1.

The piston-heads are grooved at their ends engaging the sides of the compression and expansion chambers and at their edge which moves in contact with the peripheral surfaces of the stationary cylinders. Packing strips 76 fit snugly in the grooves 77 and the grooves are connected with the spaces through which the piston-heads move by means of ducts 78 opening in a side of the pistons. It will be evident that the motive fluid admitted to the grooves through the ducts will maintain the packing strips in fluid tight contact with the surfaces they engage. The same and similar bolts as those employed to secure the sections of the housing and the stator of the compression-unit may be used to fasten the corresponding cylinder of the power-unit and the last mentioned stator like that of the compression-unit, includes an enlarged head 79 fitted within the wall of the rotor and forming one of the walls of the annular expansion-chamber. Packing rings 81 are applied in grooves of the hub of the rotor at opposite sides of the admission ports 57 and a similar packing ring 80 is placed in a groove of the head 79 of the stator to insure its fluid-tight connection with the circumferential wall of the rotor.

The contacting surfaces of the rotary and relatively stationary parts of the engine are constantly lubricated by a lubricant supplied through the medium of a pump 82ª operatively connected with the shaft 13.

The oil forcibly injected into the housing through an inlet passage 83 finds its way between the contacting surfaces of the movable and relatively stationary parts of both the compression-unit and the power-unit of the engine, it being understood that the parts may be provided with ducts wherever necessary for the passage of the lubricant from one to the other. The ducts above referred to, not being an important part of the invention, have been omitted in the drawings in order to avoid confusion.

In the operation of the engine, the compressed fuel stored in the reservoir 16 around the shaft 13 is, in a thoroughly mixed and completely vaporous condition, admitted alternately to the two series of combustion-chambers 51 at opposite sides of the partition 55 in the stator of the power unit, and upon ignition of the charges in the chambers, a portion of the gases escaping through the channels 67 will reverse the position of the valves 58 by which the passage of the fuel to the annular expansion space 52 is controlled.

The air occupying the spaces 66ª at the opposite ends of the valve-heads, provide cushions which deaden the impact of the valves with the end faces of their chambers and thereby eliminate noise and possible damage.

Owing to the fact that the hub of the rotor has but two admission ports to supply the gaseous fuel to three combustion-chambers of each series and the pair of admission ports is staggered with relation to that corresponding with the other series of combustion-chambers, the chambers of each series are fed successively and in alternate relation to those of the other series.

When the charges are admitted to the chambers, the respective valves are in the position in which they close the ducts 53ª leading to the expansion-space of the unit and are reversed only after the explosion of the charges by their ignition through the medium of the spark plug 68. The consequent slight delay in admitting the gases to the expansion-space after each explosion causes a congestion of expansive gases in the combustion-chambers with the result that upon the valves being opened, the gases rush violently into the expansion-space and thereby increase their propulsive action upon the rotor of the engine.

By reason of the alternate successions of explosions of the charges admitted to the six combustion chambers and the preponderance in number of the piston heads over the abutment-members, each piston head will receive three impulses during each revolution, so that the rotor will be propelled under the influence of twelve impulses during each complete revolution, produced at regular intervals.

The operation in this respect is so similar to that of the compression unit, explained in detail hereinbefore, that no further description is deemed necessary at this point. It is a distinctive feature in the operation of the engine, as will clearly appear upon consideration of the above explanation with reference to Figure 6 of the drawings, that each piston head receives its impulses before the charges in the immediately preceding space of the expansion chamber are spent and exhausted, so that in the operation of the engine, the rotor is continuously subjected to both high and low pressures. The forces applied to the rotor during each revolution largely exceed the effort required for the compression of the fuel, and the engine thus provides a powerful source of mechanical energy.

Having thus described my invention, what I claim and desire to secure by Letters Patent is:

1. A rotary engine comprising an outer stationary cylindrical housing, a shaft in the housing, two stators arranged side by side on said shaft, a single interposed rotor arranged concentric with the stationary housing and with the stators and receiving and cooperating with both stators to provide a compression-unit and a power-unit and means for supplying motive fluid to the compression-unit, there being a connection between the compression-unit and the power-unit for the passage of motive fluid from the one to the other.

2. A rotary engine comprising an outer stationary cylindrical housing, two stators fixed therein, a single interposed rotor arranged concentric with the housing and with the stators and receiving the latter and cooperating with both stators to provide a compression-unit and a power-unit and providing a partition by which the units are separated and means for supplying motive fluid to the compression-unit, there being a connection between the compression-unit and the power-unit for the passage of motive fluid from the one to the other.

3. A rotary engine comprising a housing, two channeled stators fixed therein, a rotor having a wall-member cooperating with both stators to form a compression-space and an expansion-space, and a hub member ported to cooperate with the channels of the stators to provide a passage for motive fluid from the compression space to the expansion-space, means for supplying motive fluid to the compression-space, and piston members and abutment members in the spaces.

4. A rotary engine comprising an outer stationary cylindrical housing, two channeled stators side by side therein, a single common rotor interposed between the stators and having a wall member arranged concentric with the cylindrical housing and with the stators and receiving the latter and cooperating with the stators to provide a compression-space and an expansion-space, means for supplying motive fluid to the compression-space, and pistons and abutments in the spaces, there being a passage connecting with the channels of the stators for the passage of motive fluid from the compression-space to the expansion-space.

5. A rotary engine comprising an outer stationary cylindrical housing, two stators side by side therein, a single common rotor interposed between and arranged concentric with the cylindrical housing and with the stators and receiving the latter and cooperating with the stators to form a compression-unit and a power-unit, there being a passage of motive fluid from the compression-unit to the power-unit, a pump for the supply of a lubricant to the contacting parts of the stators and the rotor, and means for supplying motive fluid to the compression-unit.

6. A rotary engine comprising a compression-unit and a power-unit having a common rotor, a shaft connected with the rotor, having a screw-threaded enlargement and a breast spaced apart, and the rotor having a hub screwed upon the enlargement of the shaft and shouldered to engage the breast of the same, and means for the supply of motive fluid to the compression-unit, the portion of the hub between the enlargement and the breast being spaced from the shaft and ported for the passage of motive fluid from the compression-unit to the power-unit.

7. In a rotary engine comprising an outer cylinder housing, a compression unit and a power unit arranged side by side within the housing, a rotor common to both units and receiving the same and having a cylindrical wall member arranged concentric with the housing and with the said units, a circular stator fixed to the stationary housing and forming part of the compression unit and spaced from the wall member of the rotor to form an annular compression chamber, a rotary cylindrical abutment on the stator dividing the chamber, a piston head on the wall member of the rotor cooperating with the abutment to compress a fluid in the chamber, and means for supplying motive fluid to the chamber, there being a passage for motive fluid from one unit to the other, and the stator having ducts connecting the compression chamber with the passage.

8. In a rotary engine comprising an outer stationary cylindrical housing, a compression unit and a power unit arranged side by side within the housing, a rotor common to both units, having a cylindrical wall member concentric with the housing and with the said units and provided with an internal gear, a circular stator forming part of the compression unit and spaced from the wall member of the rotor to form an annular compression chamber, a rotary toothed abutment on the stator dividing the compression chamber and meshing with the gear, a piston head on the wall member of the rotor cooperating with the abutment to compress a fluid in the chamber, and means for supplying motive fluid to the chamber, there being a passage for motive fluid from one unit to the other, and the stator having ducts connecting the compression chamber with the passage.

9. In a rotary engine comprising an outer stationary cylindrical housing, a compression unit and a power unit arranged side by side within the housing, a rotor common to both units, having a cylindrical wall member arranged concentric with the cylindrical housing, a circular stator forming part of the compression unit and arranged concentric with and spaced from the wall member of the rotor to form an annular compression chamber, a rotary cylindrical abutment on the stator dividing the chamber, a piston head on the wall member of the rotor cooperating with the abutment to compress a fluid in the chamber, the abutment being recessed for the passage of the piston head, and means for supplying motive fluid to the chamber, there being a passage for motive fluid from one unit to the other, and the stator having ducts connecting the compression chamber with the passage.

10. In a rotary engine comprising an outer cylindrical housing, a compression unit and a power unit arranged side by side within the housing, a rotor common to both units, having a cylindrical wall member arranged concentric with the cylindrical housing, a circular stator concentric with and spaced from the wall member of the rotor to provide an annular compression chamber, abutments on the stator dividing the compression chamber, each division having a duct in the stator for the discharge of compressed fluid, piston heads on the rotor, cooperating with the abutments to compress the fluid in the chamber, and means for supplying motive fluid to the chamber, there being a passage for motive fluid from the compression unit to the power unit connecting with the ducts.

11. In a rotary engine comprising an outer stationary cylindrical housing, a compression unit and a power unit arranged side by side within the housing, a rotor common to both units, having a cylindrical wall member arranged concentric with the cylindrical housing, a circular stator concentric with and spaced from the wall member of the rotor to provide an annular compression chamber, abutments on the stator dividing the compression chamber, each division having a duct in the stator for the discharge of compressed fluid, piston heads on the rotor, cooperating with the abutments to compress the fluid in the chamber and exceeding the abutments in number, and means for supplying motive fluid to the chamber, there being a passage for motive fluid from the compression unit to the power unit connecting with the ducts.

12. In a rotary engine comprising an outer stationary cylindrical housing, a compression-unit arranged side by side within the cylindrical housing and a power-unit, a rotor common to both units, having a cylindrical wall-member arranged concentric with the cylindrical housing, a circular stator concentric with and spaced from the wall-member of the rotor to provide an annular compression-chamber, abutments on the stator dividing the compression-chamber, each division having a duct in the stator for the discharge of compressed fluid, piston heads on the rotor, cooperating with the abutments to compress the fluid in the chamber and exceeding the abutments by one in number, and means for supplying motive fluid to the chamber, there being a passage for motive fluid from the compression-unit to the power-unit, connecting with the ducts.

13. In a rotary engine comprising an outer stationary cylindrical housing, a compression-unit arranged side by side within the cylindrical housing and a power-unit, a rotary element and a stationary element arranged concentric with the cylindrical housing and with each other and spaced to provide an annular compression-chamber, abutments on one of the elements dividing the chamber, each division having an inlet and a discharge duct for motive fluid, piston heads on the other element, exceeding by one the number of abutments, and a valve-member on the rotary element providing a passage from the compression-unit to the power-unit of the engine and having ports which register with the discharge ducts of the compression-chamber and which in number exceed the ducts by one.

14. In a rotary engine comprising an outer stationary cylindrical housing, a power-unit and a compression-unit arranged side by side within the housing, a shaft, a rotor having a hub member and a circumferential wall-member arranged concentric with the cylindrical housing, the hub member consisting of a sleeve surrounding the shaft and spaced therefrom to provide a passage between the units, a stator in the compression-unit concentric with and spaced from the wall-member of the rotor to provide a compression-chamber and having a sleeve-member around the hub, abutments on the stator, dividing the compression-chamber, and piston heads on the rotor cooperating with the abutments to compress fluid in the compression-chamber, each division of the compression-chamber having an inlet for motive fluid and a discharge duct extending to the hub-member of the rotor, and the hub-member having ports registering with the ducts.

15. In a rotary engine comprising an outer stationary cylindrical housing, a power-unit and a compression-unit arranged side by side within the housing, a rotor having a hub-member and a circumferential wall-member arranged concentric with the cylindrical housing, the hub-member being hollow to provide a passage between the units, a stator in the compression-unit concentric with and spaced from the wall-member of the rotor to provide a compression-chamber and having a sleeve-member around the hub, abutments on the stator, dividing the compression-chamber, and piston heads on the rotor exceeding the abutments by one in number, each division of the compression-chamber having an inlet for motive fluid and a discharge duct extending to the hub-member of the rotor, and the hub member having ports registering with the ducts and exceeding the ducts by one in number.

16. In a rotary engine, a rotor having a circumferential wall-member and a hollow and ported hub-member, a stator spaced from the wall-member of the rotor to form an annular piston-chamber, and provided with ducts opening in the chamber and registering with the ports of the hub-member, abutments on the stator dividing the chamber, and piston heads on the rotor cooperating with the abutments.

17. In a rotary engine, a rotary element and a stationary element arranged concentric and spaced apart to form an annular piston-chamber, fixed abutments on one element dividing the chamber, piston heads on the other element cooperating with the abutments, the stationary element having a combustion-chamber for each division of the chamber, in connection therewith, and the two elements having cooperative valve-members for the periodic admission of fuel to the combustion-chambers directly actuated by the pressure of the fuel.

18. In a rotary engine, a shaft, a rotor having a circumferential wall-member and a ported and hollow hub-member, consisting of a sleeve surrounding the said shaft and forming a passage extending across the rotor, a stator fitted upon the hub and spaced from the wall-member of the rotor to form an annular piston-chamber, abutments on the stator dividing the chamber, and piston-heads on the rotor cooperating with the abutments, the stator having for each division of the chamber a combustion-chamber connected with the piston-chamber and provided with an inlet adapted to register with the ports of the hub-member of the rotor communicating with the said passage.

19. In a rotary engine, a rotor and a stator spaced apart to form an annular piston-chamber, a rotary circular abutment on the stator dividing the chamber, and a piston head on the rotor cooperating with the abutment, the stator having for each division of the piston chamber, a combustion-chamber in connection therewith, and the rotor and the stator having cooperating reciprocating valve-members directly actuated and reversed by the pressure of the fuel for the periodic admission of fuel to the combustion-chambers.

20. In a rotary engine, a rotor and a stator spaced apart to form an annular piston-chamber, an internal gear on the rotor, a rotary toothed abutment on the stator, dividing the piston chamber and meshing with the gear, and a piston head on the rotor, cooperating with the abutment, the stator having for each division of the piston chamber, a combustion chamber in connection therewith, and the rotor and the stator having cooperating valve members directly actuated by the pressure of the fuel for the periodic admission of fuel to the combustion chambers.

21. In a rotary engine, a rotary element and a stationary element spaced apart to form an annular piston chamber, an abutment on one element dividing the chamber, a piston head on the other element cooperating with the abutment, the stationary element having a valve chamber in connection with the piston chamber and two combustion chambers separately connected with the valve chamber, a valve element for the periodic admission of fuel to the combustion chambers by movement of the rotary element, and a valve in the valve chamber operating to control the connections between the valve chamber and the combustion chambers whereby to alternately connect the latter with the piston chamber.

22. In a rotary engine, a rotary element and a stationary element spaced apart to form an annular piston chamber, an abutment on one element dividing the chamber, a piston head on the other element cooperating with the abutment, the stationary element having a valve chamber in connection with the piston chamber and two combustion chambers separately connected with the valve chamber, a valve element for the periodic admission of fuel to the combution-chambers by movement of the rotary element, and a valve in the valve-chamber operating by fluid pressure to control the connection between the valve-chamber and the combustion-chambers whereby to alternately connect the latter with the piston chamber.

23. In a rotary engine, a rotary element and a stationary element spaced apart to form an annular piston chamber, an abutment on one element dividing the chamber, a piston head on the other element cooperating with the abutment, the stationary element having a valve-chamber in connection with the piston-chamber and two combustion-chambers separately connected with the valve-chamber for the supply of motive fluid to the piston-chamber and having an auxiliary connection with the valve-chamber for the operation of the valve by fluid-pressure, a valve-element for the periodic admission of fuel to the combustion-chambers by movement of the rotary element, and a valve in the valve-chamber operating by fluid-pressure admitted through the auxiliary connection to control the connections between the valve-chamber and the combustion-chambers whereby to alternately connect the latter with the piston-chamber.

24. In a rotary engine, a rotary element and a stationary element spaced apart to form an annular piston-chamber, an abutment on one element dividing the chamber, a piston-head on the other element cooperating with the abutment, the stationary element having a valve-chamber in connection with the piston-chamber, and two combustion-chambers separately connected with the valve-chamber, a valve-element for the periodic admission of fuel to the combustion-chambers by movement of the rotary element, and a reciprocating valve in the valve-chamber having spaced heads controlling the connections between the combustion chambers and the piston chamber, there being an auxiliary connection between the combustion-chambers and the valve-chamber for the operation of the valve by fluid pressure.

25. In a rotary engine, a rotary element and a stationary element spaced apart to form an annular piston-chamber, an abutment on one element dividing the chamber, a piston-head on the other element cooperating with the abutment, the stationary element having a valve-chamber in connection with the piston-chamber, and two combustion-chambers separately connected with the valve-chamber, a valve in the valve-chamber operatable by fluid pressure to connect the combustion-chambers alternately with the piston-chamber, a source of fuel and a valve-element having ports arranged to connect the combustion-chambers alternately with the source of fuel by movement of the rotary element.

26. In a rotary engine, the combination with a source of fuel, of a shaft, a rotor having a circumferential wall-member and a ported and hollow hub-member consisting of a sleeve surrounding the shaft and forming a passage connecting with the source of fuel, a stator spaced from the wall-member of the rotor to form an annular piston-chamber, an abutment on the stator dividing the piston-chamber, and a piston on the rotor cooperating with the abutment, the stator having ducts registering with a port of the hub-member and connecting with the piston-chamber for the admission of motive fluid thereto.

27. In a rotary engine, the combination with a source of fuel, of a shaft, a rotor having a circumferential wall-member and a ported and hollow hub-member consisting of a sleeve spaced from the shaft and forming a passage connecting with the source of fuel, a stator spaced from the wall-member of the rotor to form an annular piston-chamber, an abutment on the stator dividing the piston-chamber, and a piston on the rotor cooperating with the abutment, the stator having a combustion-chamber, an inlet port registering with a port of the hub-member to admit fuel to the combustion-chamber from the passage, and a duct connecting the combustion-chamber with the piston-chamber.

28. In a rotary engine, the combination with a source of fuel, a rotor having a circumferential wall-member and a hollow hub-member forming a passage connecting with the source of fuel and having two series of ports, a stator spaced from the wall-member of the rotor to provide an annular piston-chamber, and having a valve-chamber connected with the piston-chamber, two combustion-chambers separately connected with the valve-chamber, and inlets registering with the series of ports in the hub-member of the rotor to admit fuel from the passage to the combustion-chambers alternately, a valve in the valve-chamber operating by fluid pressure to connect the combustion-chambers alternately with the piston-chamber, an abutment on the stator dividing the piston-chamber, and a piston-head on the rotor cooperating with the abutment.

29. In a rotary engine, the combination with a source of fuel, a rotor having a circumferential wall-member and a hollow hub-member forming a passage connecting with the source of fuel and having two series of ports in staggered relation to each other, a stator spaced from the wall-member of the rotor to provide an annular piston-chamber and having a valve-chamber connected with the piston-chamber, two combustion-chambers separately connected with the valve-chamber and inlets registering with the series of ports in the hub-member of the rotor to admit fuel from the passage to the combustion-chambers, a valve in the valve-chamber operating by fluid pressure to connect the combustion-chambers alternately with the piston-chamber, an abutment on the stator dividing the piston-chamber, and a piston-head on the rotor, cooperating with the abutment.

30. In a rotary engine, a rotary element and a stationary element spaced apart to form an annular piston-chamber, abutments on one of the elements dividing the piston-chamber, piston-heads on the other element cooperating with the abutments and exceeding the abutments in number, the stationary element having a combustion-chamber for each division of the piston-chamber in separate connection therewith, and a valve-element directly actuated by the pressure of the fuel and automatically operated to periodically admit fuel to the combustion-chambers by movement of the rotary element.

31. In a rotary engine, a rotary element and a stationary element spaced apart to form an annular piston-chamber, abutments on one of the elements dividing the piston-chamber, piston-heads on the other element cooperating with the abutments and exceeding the abutments by one in number, the stationary element having a combustion-chamber for each division of the piston-chamber in separate connection therewith, and a valve-element directly actuated by the pressure of the fuel and automatically operated to periodically admit fuel to the combustion-chambers by movement of the rotary element.

32. In a rotary engine, a rotary element and a stationary element spaced apart to form an annular piston-chamber, abutments on one of the elements dividing the piston-chamber, piston-heads on the other element cooperating with the abutments and exceeding the abutments by one in number, the stationary element having a valve-chamber for each division of the piston-chamber in separate connection therewith and two combustion-chambers for each valve-chamber separately connected therewith, valves in the valve-chambers, operating by fluid-pressure to connect the combustion-chambers alternately with the piston-chamber, and a valve-element to admit fuel alternately to the combustion-chambers of each pair by movement of the rotary element.

33. In a rotary engine, a rotary element and a stationary element spaced apart to form an annular piston-chamber, three abutments on one of the elements dividing the piston-chamber, four piston-heads on the other element cooperating with the abutments, the stationary element having a valve-chamber for each division of the piston-chamber in separate connection therewith and two combustion-chambers for each valve-chamber separately connected therewith, valves in the valve-chambers operating by fluid-pressure to connect the combustion-chambers alternately with the piston-chamber, and a valve-element to admit fuel alternately to the combustion-chambers of each pair by movement of the rotary element.

34. In a rotary engine, the combination with a source of fuel, of a rotor having a circumferential wall-member and a hollow hub-member providing a passage in connection with the source of fuel, and having two pairs of ports staggered with relation to each other and connecting with the passage, abutments on the stator dividing the piston-chamber, piston-heads on the rotor cooperating with the abutments and exceeding the abutments by one in number, the stationary element having a valve-chamber for each division of the piston-chamber in separate connection therewith, two combustion-chambers for each valve-chamber separately connected therewith, and inlets registering with the ports in the hub-member of the rotor to admit fuel from the passage alternately to the combustion-chambers of each pair by movement of the rotor, and valves in the valve-chambers operating by fluid pressure to alternately connect the combustion-chambers of each pair with the piston-chamber.

35. A rotary engine comprising an outer stationary cylindrical housing, a shaft, a compression-unit and a power-unit arranged side by side on the shaft in the housing having a common rotor concentric with the housing and with the said units and receiving the same, means for supplying motive fluid to the compression-unit, the rotor having a hub consisting of a sleeve of varying diameter and spaced from the shaft to provide a reservoir for motive fluid delivered from the compression-unit, a narrower passage to conduct the motive fluid to the power-unit, and means for controlling the passage of motive fluid from the compression unit to the combustion chamber.

36. A rotary engine comprising an outer stationary cylindrical housing, a compression-unit and a power-unit mounted for co-operation side by side within the housing and having a common rotor arranged concentric with the housing and with the said units and receiving the latter, a reservoir in the housing for motive fluid delivered from the compression-unit, a passage to conduct the motive fluid to the power-unit and means for controlling the passage of the motive fluid from the compression unit to the power unit.

37. A rotary engine comprising an outer stationary cylindrical housing, a compression-unit and a power-unit mounted for co-operation side by side within the housing and having a common rotor concentric with the housing and with the units and receiving the latter, a reservoir in the housing for motive fluid delivered from the compression-unit, a narrower passage to conduct the motive fluid to the power-unit and means for controlling the passage of the motive fluid from the compression unit to the power unit.

38. A rotary engine comprising an outer stationary cylindrical housing, a compression-unit and a power-unit mounted for co-operation side by side within the housing and having a common rotor concentric with the housing and with the units and receiving the latter, a mixing chamber in the housing for motive fluid delivered from the compression-unit, in connection with the power-unit and means for controlling the passage of the motive fluid from the compression unit to the power unit.

39. A rotary engine including an outer stationary cylindrical housing comprising a compression unit and a power unit provided each with a stator, said compression unit and power unit having a single common rotor interposed between the stators and arranged concentric with the outer housing, there being a connection between said units for the passage of motive fluid from one to the other, and means for supplying motive fluid to the compression unit.

40. A rotary engine including an outer stationary cylindrical housing compressing a compression unit and a power unit provided each with a stator, said compression unit and power unit having a single common rotor interposed between the stators and arranged concentric with the outer housing, means for supplying motive fluid to the compression unit, the rotor having a shaft and a ported hub spaced from the shaft to provide a passage between the shaft and the hub for the motive fluid from the compression unit to the power unit.

41. A rotary engine including an outer stationary cylindrical housing comprising a compression unit and a power unit provided each with a stator, said compression unit and power unit having a single common rotor interposed between the stators and arranged concentric with the outer housing, and a shaft composed of a body section supporting the rotor, an extension section, and a flexible connection between the sections located within the cylindrical housing.

In testimony whereof, I have hereunto affixed my signature.

WILLIAM V. SEIFERT.